United States Patent [19]
Miller et al.

[11] Patent Number: 5,081,421
[45] Date of Patent: Jan. 14, 1992

[54] IN SITU MONITORING TECHNIQUE AND APPARATUS FOR CHEMICAL/MECHANICAL PLANARIZATION ENDPOINT DETECTION

[75] Inventors: Gabriel L. Miller, Westfield; Eric R. Wagner, South Plainfield, both of N.J.

[73] Assignee: AT&T Bell Laboratories, Murray Hill, N.J.

[21] Appl. No.: 517,106

[22] Filed: May 1, 1990

[51] Int. Cl.$^5$ ............................................. G01R 27/26
[52] U.S. Cl. .................................. 324/671; 324/688; 156/627
[58] Field of Search ............... 324/671, 688, 158 D, 324/687; 437/8; 156/627, 635, 636, 637

[56] References Cited

U.S. PATENT DOCUMENTS

| | | |
|---|---|---|
| 3,063,206 | 11/1962 | Meyerhoff et al. |
| 3,148,129 | 9/1964 | Basseches et al. ............... 324/158 D |
| 3,515,987 | 5/1970 | Zurbrick et al. .................. 324/687 |
| 3,803,489 | 4/1974 | Miller . |
| 4,197,679 | 4/1980 | Sauerland . |
| 4,199,902 | 4/1980 | Sauerland . |
| 4,241,167 | 12/1980 | Collins et al. .................. 324/158 D |
| 4,407,094 | 10/1983 | Bennett et al. |
| 4,473,795 | 9/1984 | Wood ....................................... 437/8 |
| 4,793,895 | 12/1988 | Kaanta et al. . |
| 4,956,611 | 9/1990 | Maltiel ............................... 324/671 |

OTHER PUBLICATIONS

B. Davari et al, "A New Planarization Technique . . . ", IEEE, Jul. 1989, pp. 61–64.

*Primary Examiner*—Kenneth A. Wieder
*Assistant Examiner*—Maura K. Regan
*Attorney, Agent, or Firm*—Oleg E. Alber

[57] ABSTRACT

This invention provides an in situ monitoring technique and apparatus for chemical/mechanical planarization end point detection in the process of fabricating semiconductor or optical devices. Fabrication of semiconductor or optical devices often requires smooth planar surfaces, either on the surface of a wafer being processed or at some intermediate stage e.g. a surface of an interleaved layer. The detection in the present invention is accomplished by means of capacitively measuring the thickness of a dielectric layer on a conductive substrate. The measurement involves the dielectric layer, a flat electrode structure and a liquid interfacing the article and the electrode structure. Polishing slurry acts as the interfacing liquid. The electrode structure includes a measuring electrode, an insulator surrounding the measuring electrode, a guard electrode and another insulator surrounding the guard electrode. In the measurement a drive voltage is supplied to the measuring electrode, and in a bootstrap arrangement to a surrounding guard electrode, thereby measuring the capacitance of the dielectric layer of interest without interfering effect from shunt leakage resistance. The process and apparatus are useful not only for measuring the thickness of dielectric layers on conductive substrates in situ, during planarizing polishing, but also for measuring the dielectric thickness on substrates in other processes, e.g. measuring the dielectric layer thickness prior to or after an etching process.

46 Claims, 8 Drawing Sheets

IN SITU MONITORING TECHNIQUE AND APPARATUS FOR CHEMICAL/MECHANICAL PLANARIZATION ENDPOINT DETECTION

FIELD OF THE INVENTION

This invention relates to a method and apparatus for use in fabricating semiconductor or optical devices and includes determination of a planarization endpoint during a chemical/mechanical lapping process of substrate wafers.

BACKGROUND OF THE INVENTION

Fabrication of semiconductor integrated circuits or integrated optical circuits very often requires a smooth, planar surface. The surface requiring planarization involves areas or layers of dielectric material on or in a surface of a semiconductor material or on a surface of a previously interleaved layer. The insulating layers should have a smooth surface topography, because rough surfaces cause fabrication problems. It is difficult to image and pattern layers applied to rough surfaces, and this difficulty increases as the number of layers increases because each additional patterned layer contributes additional roughening. The topography of such dielectric areas or layers may be highly uneven and require polishing of the surface so as to present a smooth, planar surface for the next processing step, such as formation of a conductor layer or pattern on this surface. The uneven surface topography may be due to areas of dielectric material which are higher than the remainder of the surface or because of an uneven topography of underlying material or other elements of the semiconductor device being fabricated.

For example, in VLSI fabrication technology, connecting metal lines are formed over a semiconductor substrate containing device circuitry and serve to electrically interconnect the discrete devices. These connecting metal lines are typically insulated from the next interconnection level by thin layers of insulating material. In order to interconnect metal lines of different interconnection levels, holes are formed in the insulating layers to provide electrical access therebetween.

A recent development in the art is the use of lapping machines, and other planarization processes to provide smooth insulator topographics for the next metal level. In these processes it is often important to determine an end point of the polishing process, for example to remove a sufficient amount of material so as to provide a smooth, planar surface without removing underlying material. Thus, a precise endpoint detection technique is needed.

Presently, there are various types of lapping machines for reducing the thickness of semiconductor wafers. In general, these lapping machines include top and bottom plates (e.g. a polishing table and a wafer carrier or holder), between which the wafers are positioned. The plates are moved relative to each other, and a polishing slurry is fed between the semiconductor wafer and one plate to polish and flush away the wafer particles. An example of one such a lapping machine is disclosed in U.S. Pat. No. 3,063,206.

Traditionally, lasers and other optical detection devices have been employed to determine etch endpoints. However, such optical systems are difficult to implement in lapping machines, because in such machines the wafers are polished face down against a moving (e.g. spinning) polishing table. More particularly, the wafer is hidden under the top plate thereby making optical endpoint detection difficult.

A typical method employed for determining endpoint in lapping machines is to measure the amount of time needed to planarize the first wafer, and then to run the remaining wafers for similar times. In practice this method is extremely time consuming, since operators must inspect each wafer after polish. This is because it is extremely difficult to precisely control the rate of dielectric film removal for different wafers since the rate of removal may vary during the polishing of an individual wafer or because the rate of removal may diminish in the process of polishing a number of wafers in sequence.

Thus, a continuing need exists in the semiconductor devices fabrication art for a method and an apparatus which would accurately and efficiently detect the endpoint of a lapping planarization process.

SUMMARY OF THE INVENTION

The invention is a method and apparatus for nondestructively, accurately and efficiently detecting an end point of a polishing/lapping planarization process in the process of fabricating semiconductor or optical devices. The method comprises placing a substrate being processed so that a surface of an electrode structure faces a dielectric material on a lateral face of the substrate, interposing between the substrate and the electrode structure a film of a conductive liquid with resistivity of less than about 100,000 ohm-cm, and measuring the capacitance between the substrate and the electrode structure. The apparatus comprises: at least one electrode structure having a flat surface facing a lateral face of a workpiece being polished and having dielectric layer thereon, the electrode structure comprises measuring electrode, an insulator about the measuring electrode, a guard electrode about the insulator, and another insulator surrounding the guard electrode; means for providing conductive liquid medium such that the lateral face of the workpiece and the flat surface of the electrode structure are interfaced by the liquid medium, and means for measuring the capacitance between the conductive portion and the electrode structure. The invention is useful in manufacturing semiconductor and optical devices which require planarization of dielectric surface at certain stages of fabrication. The invention may also be used for measuring the thickness of dielectric film at any stage of manufacture, whether or not planarization is involved.

DETAILED DESCRIPTION

FIGS. 1 and 2, 3, and 4 and 5 are general schematic representations of a conductive wafer in the process of fabricating a semiconductor or optical device. The material of the wafer may be selected from at least silicon, germanium, Group III-V and Group II-IV compound semiconductors. Typically the material of the conductive wafer has a resistivity of less than about one megohm-cm.

Figure 1:
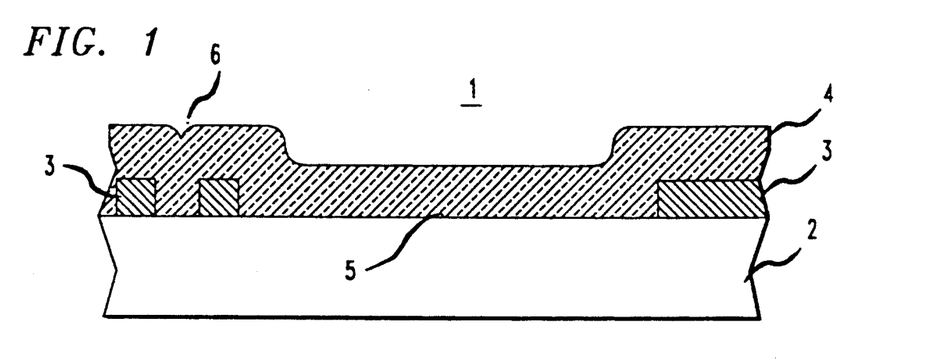
FIG. 1 is a schematic representation of a semiconductor device being fabricated and having a thick dielectric layer upon a semiconductor wafer.

In FIG. 1 is shown a semiconductor device 1, which includes semiconductor wafer, 2, metallic conductors, 3, and a thick dielectric layer, 4, such as silicon dioxide, overlying the conductors and the remainder of surface, 5, of the semiconductor wafer. The dielectric layer may be formed in a suitable manner, e.g. by chemical vapor deposition (CVD) of oxide or by plasma enhanced CVD (PECVD) of oxide from precursors such as tetraethyl orthosilicate (TEOS). Semiconductor wafer 2 may have been preprocessed and may already include additional layers of interleaved circuitry. For the sake of simplicity, those other features are not represented in these figures.

Figure 2:
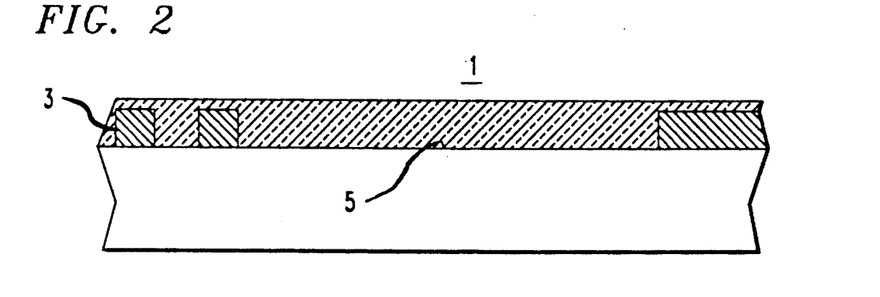
FIG. 2 is a schematic representation of the semiconductor device of FIG. 1 with a planarized dielectric layer.

FIG. 2 is shown wafer 2 with dielectric layer 4 planarized to a desired preselected thickness.

Figure 3:
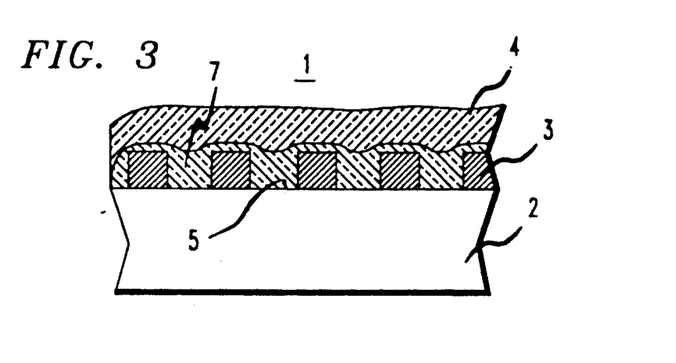
FIG. 3 is a schematic representation of a semiconductor device being fabricated and having a composite thick dielectric layer upon a semiconductor wafer.

In FIG. 3 is shown a schematic representation of device, 1, in which conductors, 3, are arranged in closer spaced, greater density. Due to the nature of the formation of the dielectric layer, 4, this configuration may lead to scalloping of the dielectric layer (e.g., such as a dip 6 in FIG. 1), or even voids between the conductors. To prevent the formation of voids, the volumes between the conductors are first filled with a layer, 7, of more conformable material, such as spin-on glass (SOG). Layer 7 fills the voids between the conductors and covers the conductors, presenting a smoother surface than a similar thickness of a CVD or PECVD deposited dielectric such as (PETEOS). The dielectric layer (PETEOS) is then deposited over layer 7 in an additional thickness and planarized in a lapping machine to a preselected thickness, similarly to FIG. 2. In this arrangement semiconductor wafer 2 typically includes preprocessed layers of interleaved circuitry.

Figure 4:
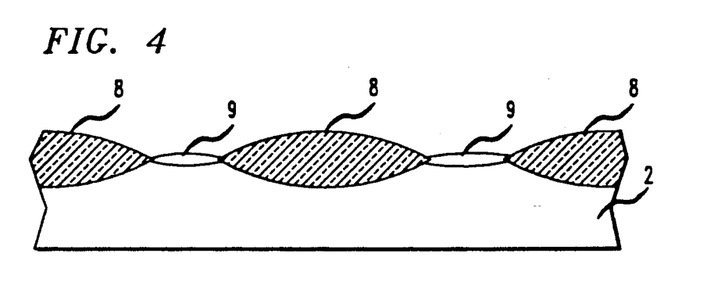
FIG. 4 is a schematic representation of a semiconductor device being fabricated and having uneven oxide areas on the surface of the semiconductor wafer.

In FIG. 4 is shown another variant wherein islands of thermally grown field oxide, 8, separated by areas of thin dielectric, 9, are within and above the surface of wafer 2. The islands display an uneven topography which is unsuitable for the continued sequential formation of patterned conductive and insulating layers. In this case, rather than depositing an extra dielectric layer onto thin dielectric areas 9, the field oxide itself may be planarized until the uneven portions of the islands are removed. As an end-point, one may select a planarized oxide surface which is even with the wafer surface or one that is a few nanometer above the thin oxide surface.

Figure 5:
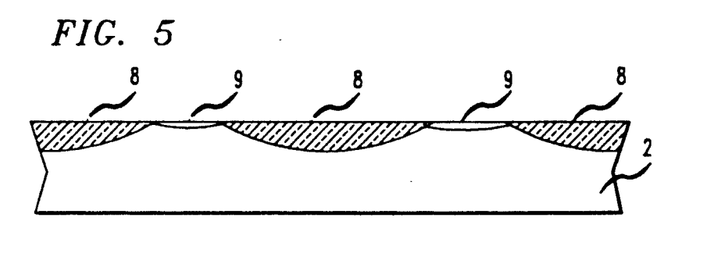
FIG. 5 is a schematic representation of the semiconductor device of FIG. 4 with a planarized oxide and wafer surface.

In FIG. 5 is shown wafer 2 with planarized oxide surface.

At the beginning of the planarization or polishing process, at least one lateral face of a conductive wafer 2 in FIG. 1 is covered with a thick dielectric layer 4. As the planarization process proceeds, the thickness of the dielectric layer is reduced. It is highly desirable to be able to monitor the remaining thickness of the dielectric layer in situ during the polishing process and to be able to stop the polishing when a precise desired thickness (an end-point) is reached. This has been accomplished by the capacitive method for the dielectric thickness measurement according to the present invention. The thickness of the dielectric layer remaining on the semiconductor wafer is monitored during the planerizing-/lapping process by measuring the electrical capacitance of the dielectric layer in the manner described hereinbelow.

Figure 6:
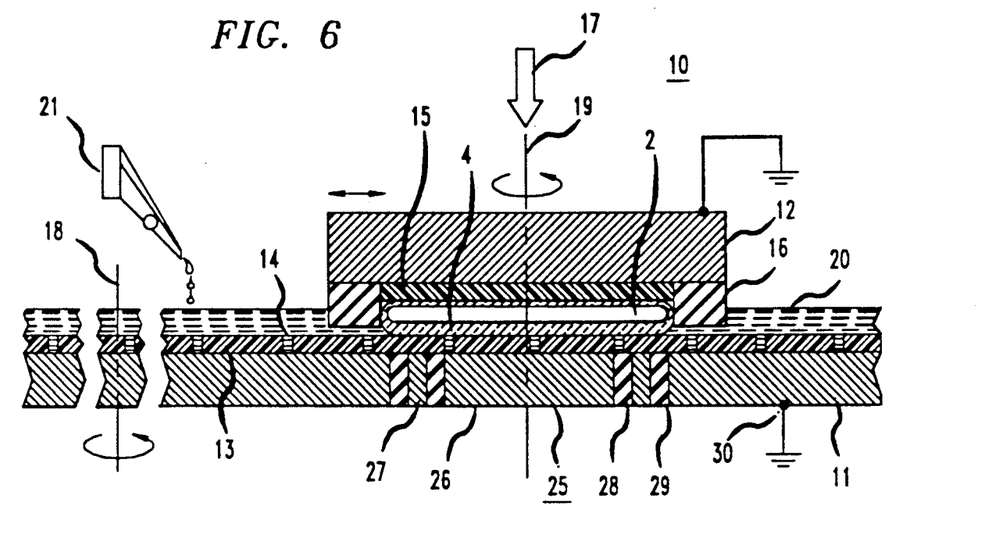
FIG. 6 is a schematic representation of apparatus useful in polishing/lapping of a dielectric layer on a wafer of the type disclosed in FIGS. 1, 3 and 4 and embodying electrode structure in accordance with the present invention.

In FIG. 6 is shown an apparatus, generally designated as 10, for chemical/mechanical polishing of a typical conductive, e.g. semiconductor, wafer 2 covered with dielectric layer 4 of insulating material, such as silicon dioxide or PETEOS. Here the wafer is shown with a dielectric layer on both sides, a thicker layer on one side and a thinner layer on the other. Preferably the wafer has a thick dielectric layer only on the side to be polished.

The apparatus includes a polishing table or platen 11 and a wafer carrier or holder 12. Both the polishing table and the wafer carrier may be of a conducting material, such as a cermet or a metal, e.g. stainless steel, aluminum, or of metals such as aluminum, chromium or titanium deposited in suitable patterns on insulating materials, or of some non-conducting material such as quartz, ceramic, plastic, or enamel or plastic-coated metal. An important requirement for the material of the table and the wafer carrier is that the material should not contribute to the contamination of the workpiece (wafer) being polished. Semiconductor wafer 2, which is to be processed in accordance with the invention, is shown positioned between polishing table 11 and wafer carrier 12. Polishing table 11 includes a polishing pad, 13, attached to the table. Wafer carrier 12 includes an insert pad 15 and an insulating edge ring 16 which prevents the wafer from sliding out from under the wafer carrier during the polishing process. Insert pad 15 is preferably made from soft material to avoid damage to the wafer from the weight of work carrier 12 and from the force (indicated by an arrow 17) applied to the wafer carrier to keep the wafer in positive contact with the surface of polishing pad 13. Insert pad 15 and polishing pad 13 are commercially obtainable pads having desired diameters. Pads which are about 50 mils thick are typically spongy and are typically provided with a plastic adhesive backing so as to adhere to the surface to which they are to be secured and to enable removal and replacement of worn pads. Such pads are available from Rodel, Inc., 451 Belleview Road, Diamond State Industrial Park, Newark, Del. 19713, U.S.A. Alternatively, spongy pads without continuous adhesive plastic backing may be secured to the table by means of a suitable conductive adhesive.

In the preferred embodiment, polishing table 11 is rotatable about its central axis, 18. Wafer carrier 12 is also rotatable about its own central axis 19, which, except for a limited oscillating motion (see a double headed arrow) relative to the polishing table, is fixed relative to axis 18 of the polishing table. In operation, polishing table 11 rotates at first predetermined RPM about its axis 18 so as to present a continuously advancing polishing surface to the dielectric layer being planarized. While wafer carrier 12 rotates at second predetermined RPM about its central axis 19, the wafer is being polished along an annular polishing area of the polishing table.

The polishing process is conducted by placing semiconductor 2 with dielectric layer 4 thereon within the cavity formed in wafer carrier 12 by insert pad 15 and edge ring 16 so that the dielectric layer 4 contacts polishing pad 13. During polishing, polishing pad 13 is being continuously supplied with an aqueous slurry 20 via supply nozzle 21, while the table 11 rotates about its central axis. As with the materials of the polishing table and wafer carrier, the slurry should be of a kind which is non-contaminating and except for the polishing action, non-destructive to the conductive wafer being polished. The slurry used in the preferred embodiment is a commercially available, slightly alkaline (pH 8.3–8.7) colloidal-silica slurry available from Nalco Chemical Company, 6216 West 66th Place, Chicago, Ill., 60638, U.S.A. as NALCO 2360, with a particle size of approximately 50–70 nm, diluted 1:1 with deionized water. Other polishing slurries are commercially available, and other dilutions may be useful.

As the polishing proceeds, it is desirable to monitor in situ the thickness of the remaining dielectric layer and to determine a desired end-point of the polishing process. In accordance with this invention this may be accomplished by capacitively measuring the thickness of the dielectric layer 4 on wafer 2 during polishing. The capacitive measurement procedure involves the dielectric layer and the polishing slurry solution. In this procedure, up to a few micrometers thick layer of dielectric on a semiconductor wafer (or slice) comprises the insulating layer in a parallel plate capacitor, while the polishing solution itself is used as a conducting layer on the outer surface of the dielectric. However, to effectively conduct such monitoring with the above-described apparatus, the following four conditions or problems need to be addressed:

1) During polishing, the wafer is in effect completely surrounded by the conducting polishing slurry (thereby tending to short-circuit the capacitor);
2) The slurry should not itself contribute any significant spurious capacitive effects;
3) The measurement should only be sensitive to the dielectric thickness of the side undergoing polishing;
4) The measurement output should be linear in thickness.

Problems associated with these conditions are resolved as described hereinbelow.

Figure 7:
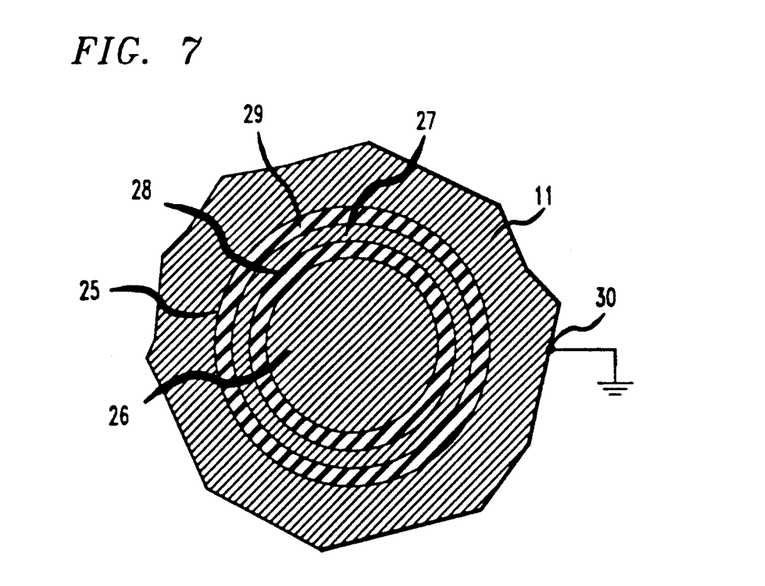
FIG. 7 is a schematic top view representation of an electrode structure shown in FIG. 6 mounted within a section of a polishing table.

First, the condition that the entire wafer is surrounded by a conductor (for example an aqueous slurry) during the polishing process, means that any capacitance measurement would tend to be short-circuited during the measurement process. This difficulty is circumvented, according to this invention, by using an electrode structure, 25, built along the polishing path into polishing table 11 transversely thereof as shown in FIGS. 6 and 7. The electrode structure includes a measuring electrode 26, a guard electrode 27 and a pair of insulators 28 and 29. The surface of electrode structure 25 facing the wafer is in the same plane as the remainder of the table. Measuring electrode 26 and guard electrode 27 are connected to a source of voltage oscillating at a certain frequency, while the rest of the polishing table is connected to ground 30. Measuring electrode 26 is completely surrounded in succession by insulator 28, guard electrode 27 and insulator 29, thereby isolating it electrically from the surrounding ground plane of the polishing table. If a conductor coated with a dielectric film, e.g. a dielectric coated silicon wafer, is placed on top of this structure (as in slurry polishing) then one has the situation shown in FIG. 6. Here the semiconductor (e.g. silicon) wafer is pressed down, typically with a pressure of several pounds per square inch, on top of a spongy polishing pad 13 that is continuously soaked with an aqueous polishing slurry 20 from slurry supply nozzle 21. In typical operation both the polishing pad 13 and the wafer itself rotate independently of each other, and at least the wafer oscillates horizontally, to obtain a uniform polishing action. In this embodiment the electrode structure 25 is mounted in polishing table 11, and electrical connections to measuring electrode 26 and to guard electrode 27 are made at 31 and 32 (FIG. 9), respectively, by suitable electro-conductive means, such as via electrical slip rings (not shown). (It is also possible, at the price of greater complexity, to use rotating transformers.) This means, of course, that a measurement is made only periodically, as the electrode structure sweeps under the wafer. To increase the number of measurements per single sweep of the polishing table, more than one electrode structure 25 may be built into the polishing path of table 11 so that the measurements may be taken several times during a single revolution of the polishing table. Other arrangements are possible, as will be discussed later.

The second problem that arises is that of the high dielectric constant of water, which is the dominant component (electrically) of polishing solution 20. In this connection it must be noted that the important quantity is the dielectric relaxation time $\tau_D$, defined by, $$\tau_D = \frac{K\rho}{4\pi}. \quad (1)$$

Here K is the dielectric constant of water (~80), and $\rho$ is the resistivity of the polishing slurry solution. For operating frequencies large compared to $1/\tau_D$ the polishing slurry between two electrodes behaves like a (lossy) capacitor. For frequencies low compared to $1/\tau_D$ the polishing slurry forms a resistor. For this reason, as well as other measurement considerations, it is advantageous to use a low operating alternating voltage frequency. The system described herein below operates at ~500 Hz, and can be operated at a frequency of up to about 5000 Hz, and the polishing slurry appears essentially resistive at such frequencies.

Given the regime of FIG. 6, and a low operating frequency, it is clear that the slurry soaked polishing pad acts like a resistor. This pad is typically secured to the polishing table by a continuous layer of a plastic adhesive backing (not shown) a few mils thick. Therefore, for the slurry to make direct electrical contact with the electrode structure, the plastic adhesive backing must be perforated at least in the electrode structure area. Thus, in order for the polishing slurry to make true resistive contact to the measuring and guard electrodes, holes are needed in the adhesive backing. In this embodiment, holes, 14, were formed right through the pad and the plastic adhesive backing by perforating the pad right through the backing with ~0.18 cm (~70 mil) diameter holes on ~0.63 cm (~0.25 inch) centers. There is nothing critical about these particular dimensions and other dimensions may be selected as well. Also, the pad does not have to be perforated completely. The important condition is the provision of a path between the aqueous slurry and the metallic table. Therefore, holes may be formed only through the adhesive backing. Furthermore, it is not necessary to make holes throughout the whole area of the pad. It would be sufficient to make holes only in the area of the electrode structure and at least an area of the polishing table immediately surrounding the electrode structure. Also, polishing pad 12 may be secured to the polishing table with a suitable, non-contaminating conductive adhesive, thus eliminating the need for holes 14.

Figure 8:
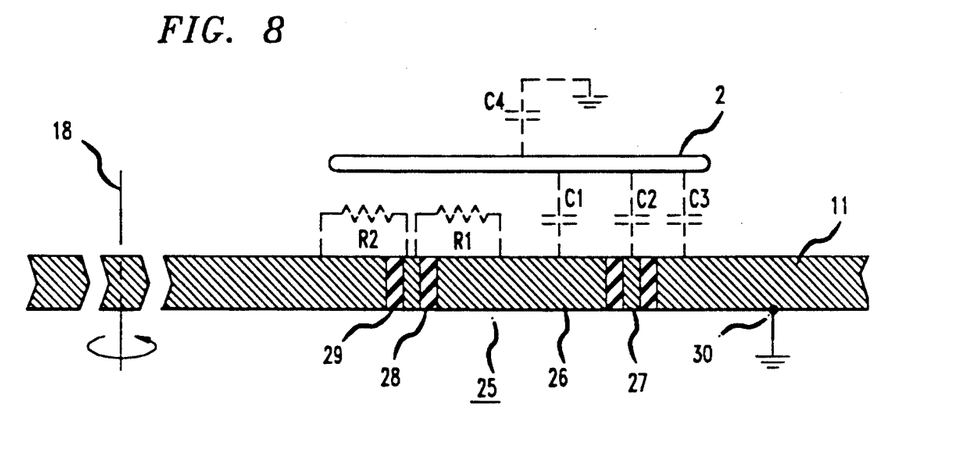
FIG. 8 is a schematic representation of distribution of capacitances and resistances which are present in the FIG. 6 arrangement.

With perforated pad 13, and with the system of FIGS. 6 and 7 operating with a low frequency applied voltage, the electrical situation of interest is as shown in FIG. 8. Here C1, C2, C3 are capacitances through the thick dielectric layer on the lateral face of the wafer facing the polishing table, while C4 is the (typically much larger) capacitance of the dielectric layer on the opposite (back) face of the wafer. Resistors R1 and R2 are the transverse (annular) resistive film values of the slurry loaded polishing pad. The object is to measure the value of the capacitor C1 alone, which then provides a measure of the thickness of the dielectric layer 4. For the time being it will be assumed that C4>>C1 which simplifies the interpretation of the measurement. This restriction will be removed later.

As an important practical matter it will, in addition, be noted that the value of C1 scales like the area of the measuring electrode, while the undesired parallel leakage resistances R1, R2 scale like the perimeter of the measuring electrode. It is therefore advantageous, particularly at low measurement frequencies, to use an area of measuring electrode 26 as large as practical. The effect of R1 is then further minimized by bootstrapping it from the measuring electrode, that is from electrode 26. Bootstrapping means that the same voltage is applied to guard electrode 27 as is measured to be present on the measuring electrode 26. Therefore no current flows (to first order) through R1, i.e. its effect has been removed in the measurement of C1. (Of course a current flows through R2 to ground, but this current does not enter in the measurement process and could in any case be eliminated if the area of table 11 surrounding electrode structure 25, is non-conductive.)

The third problem is the fact that it is inconvenient to contact both sides of the wafer independently. And, the fourth problem resides in the conventional measurement of capacitors, which typically provides a reciprocal relationship (i.e. as the dielectric film becomes thinner, the measured alternating current becomes larger). Both of these problems may be solved by the system shown in FIG. 9.

Figure 9:
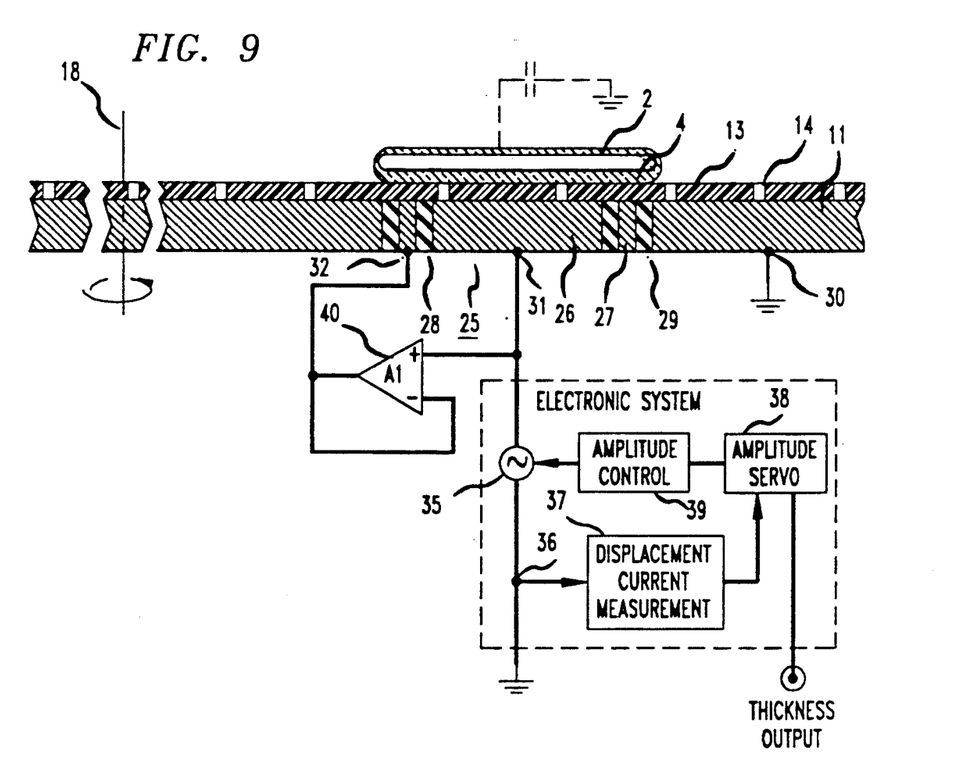
FIG. 9 is a schematic representation of FIG. 6 arrangement including an electrical system for driving the measuring and guard electrodes.

In the system shown in FIG. 9, measuring electrode 26 is driven with an alternating voltage from oscillator 35. The resulting displacement current flowing to the measuring electrode necessarily flows to ground through 35 itself, and its amplitude is measured at 36 and compared with a reference value at 38. Any resulting difference is then used at 39 to control the amplitude of oscillator 35, in such a way as to hold the displacement current itself constant. As a result the amplitude of the drive voltage to the measuring electrode is always precisely proportional to the thickness of the dielectric layer on the silicon slice. Guard electrode 27 is bootstrapped from the measurement electrode 26 by a unity gain follower amplifier (A1) 40.

Figure 10:
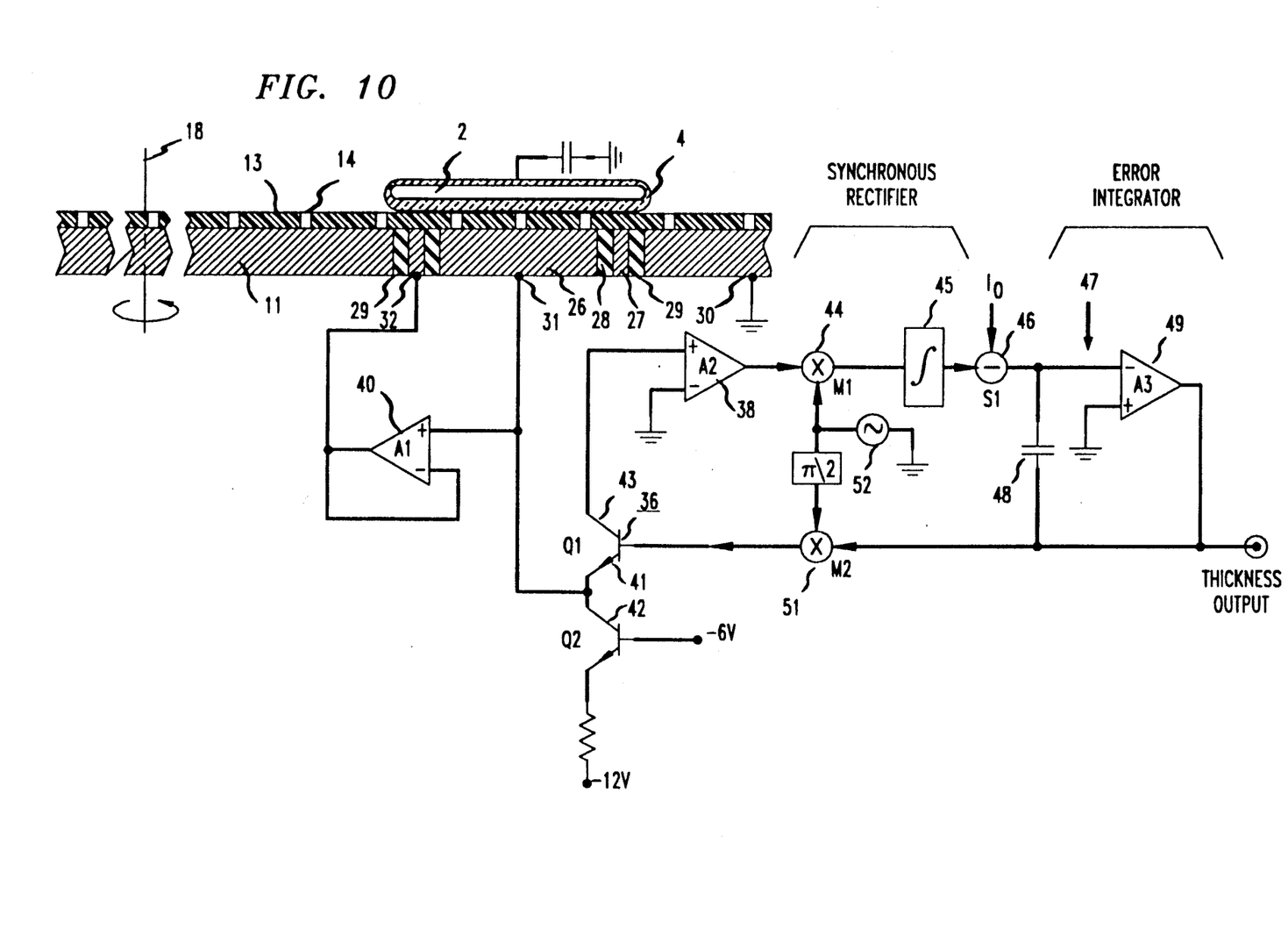
FIG. 10 is a more detailed schematic representation of the electronic system shown in FIG. 9 of the drawings.

This scheme is shown in greater detail in FIG. 10. Measuring electrode 26 is driven with an alternating voltage by the emitter follower transistor while the guard electrode 27 is driven with an alternating voltage by amplifier (A1) 40 so as to follow precisely the measuring electrode voltage. Since the collector, 42, of a constant current generator transistor (Q2) presents a very high impedance to the emitter, 41, of transistor (Q1) it follows that all the displacement current flowing to the measuring electrode must flow in the collector, 43, circuit of transistor (Q1). Consequently the AC component of the collector current of transistor (Q1) comprises only the desired signal current. This signal is amplified by amplifier (A2) 38 and synchronously rectified by a multiplier (M1), 44, and low pass filter 45. The resulting signal current is compared with the constant value reference current (Io) at 46 and any resulting difference drives the error integrator 47 formed by capacitor 48 and operational amplifier (A3) 49. The output of this integrator then forms one input to a multiplier (M2), 51, the other input being derived (through a $\pi/2$ phase shift) from oscillator 52. As a result the drive to the measuring electrode 26 is constantly servoed to such a value that its displacement current is constant. It therefore follows that the integrator output from amplifier (A3) 49 is accurately proportional to the dielectric thickness.

Figure 11:
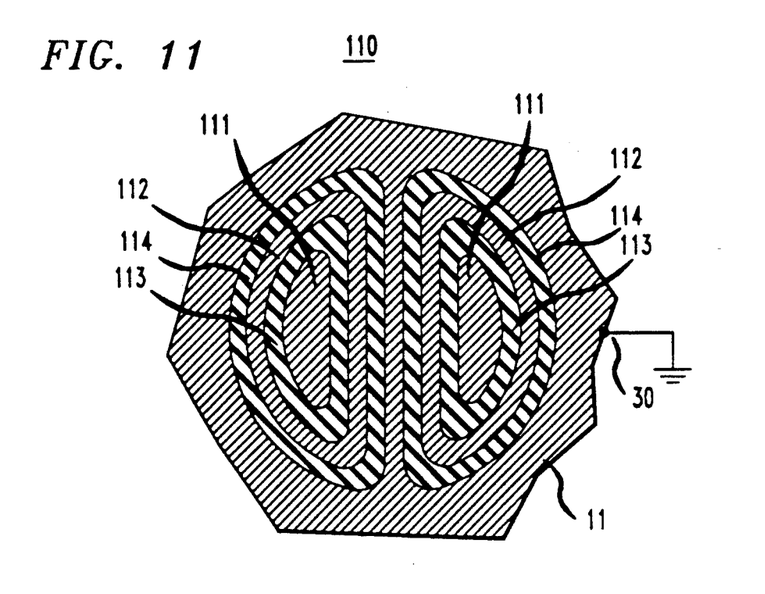
FIG. 11 is a schematic representation of a section of the polishing table with a double "D" electrode structure, which is an alternative version of electrode structure shown in FIGS. 6 and 7, enabling monitoring of the thickness of dielectric layer being polished independently of the thickness of dielectric layer on the opposite lateral face of the semiconductor wafer.
Figure 12:
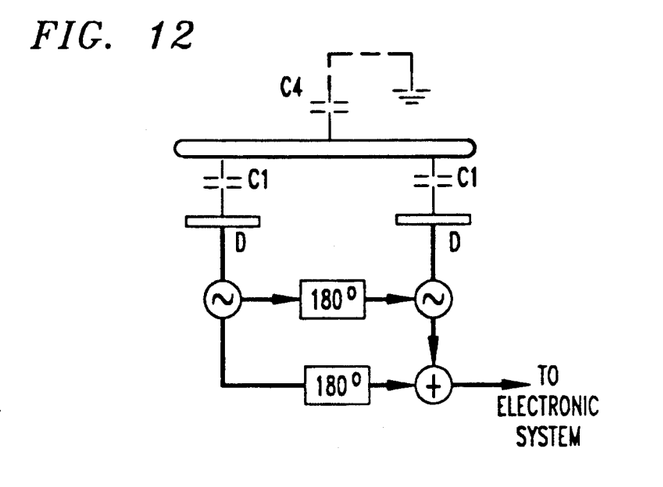
FIG. 12 is a schematic representation of distribution of capacitances in the FIG. 11 arrangement, demonstrating that the thickness of the dielectric layer being polished with capacitance C1 can be measured independently of the dielectric layer thickness on the opposite face of the wafer with capacitance C4.

This arrangement is effective if the measurement is conducted with a wafer one (upper) face of which is bare. In those cases where also the back of the wafer is coated with a dielectric layer, the effect of C4 of FIG. 8 would complicate the situation. This effect may be circumvented as follows:

The complication of the effect of C4 in FIG. 8 is due to the fact that the potential of the substrate 2 changes as it is driven through C1. If the potential of the wafer does not change then clearly no displacement current flows through C4, and consequently the value of C4 itself would be irrelevant. One convenient way to achieve this is to drive the substrate symmetrically in such a way that its potential does not change. This can be achieved by using two identical electrode structures 110 as shown in FIG. 11. These two "Dee" shaped (double-D) electrodes are driven in antiphase as shown in FIG. 12. As before, each electrode structure includes a measuring electrode 111 which is surrounded by its own guard electrode 112 and insulators 113 and 114. Consequently the only currents observed flowing to measuring electrodes 111 of each D electrode structure are those flowing through each respective C1 in series. These two currents are added (one having been reversed by 180°) and used in an electronic system essentially identical to that of FIGS. 9 or 10. This system removes any concern with the presence, or absence, of an insulating (dielectric) layer on the back of the silicon slice. The thickness output voltage is again linear in dielectric layer thickness.

Figure 13:
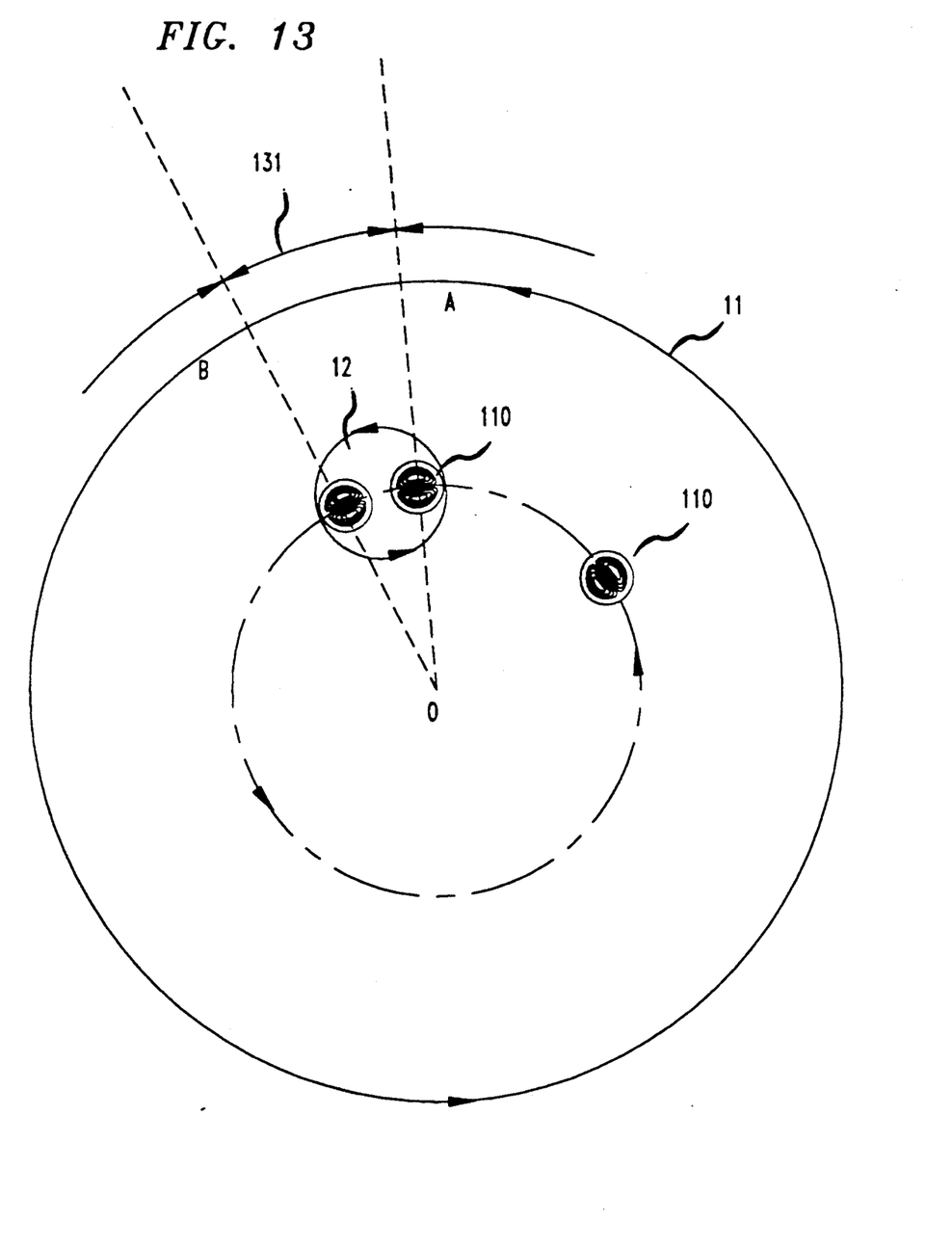
FIG. 13 is a schematic top view representation of a polishing arrangement with a double "D" electrode structure in the polishing table, including a scheme for taking time and position dependent measurements of the dielectric layer thickness during each revolution of the polishing table.

In addition it is advantageous to perform measurements of the dielectric layer thickness over preselected time periods. For this purpose the diameter of each double-D electrode structure is made smaller than the diameter of the semiconductor wafer. As the double-D electrode structure moves along its path around the central axis of the polishing table and past the semiconductor wafer, the measurements are taken within the period for which the double D electrodes are entirely underneath the semiconductor material. As shown in FIG. 13, measurements are taken over a preselected fraction 131 of a complete rotation of the polishing table. During this period, measurements can be taken with a double D electrode structure 110 at different positions of the path underneath the wafer. Since, at the same time, the wafer rotates about its own axis, different portions of the wafer surface are presented to the double-D electrode structure. These measurements can either simply be averaged, or else examined individually to reveal the spatial uniformity of the polishing process.

Figure 14:
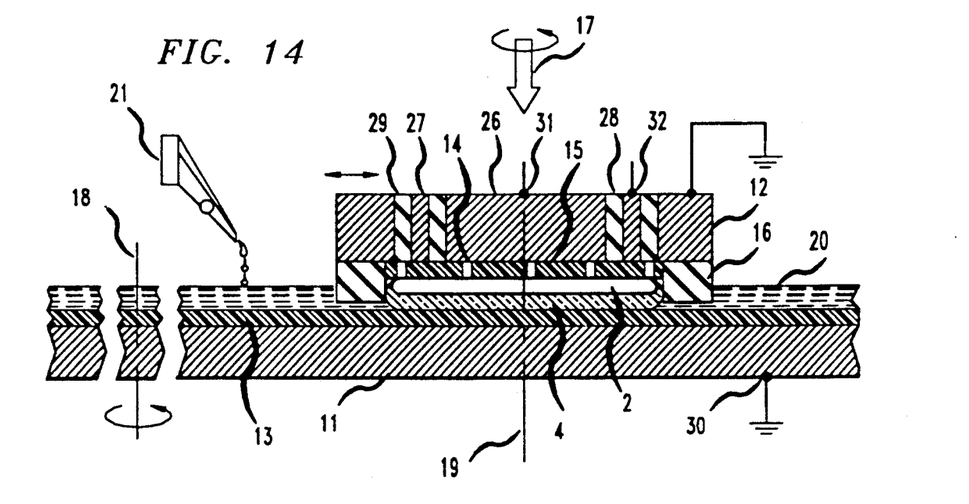
FIG. 14 is a schematic representation of an alternative embodiment for planarizing dielectric layer endpoint-detection of a semiconductor wafer.

In yet another embodiment, shown in FIG. 14, the thickness of a dielectric layer on only one face of the wafer (one facing the polishing pad) may be measured by an arrangement similar to that of FIG. 6 but with the electrode structure 25 built not in the polishing table 11 but in the wafer carrier 12.

The components of the electrode structure 25 in this embodiment are the same as previously described, namely, a measuring electrode 26, a guard electrode 27, insulators 28 and 29 and electrical connections 31 and 32 from measuring electrode 26 and guard electrode 27, which are made to the electronics identical to electronics of FIGS. 9 and 10. In this case, as before, the plastic adhesive backing on insert pad 15 must be perforated to ensure electrically conductive path from the wafer to the electrode structure. In this embodiment measurement is not restricted only to the period in which the electrode structure passage under the wafer of FIG. 13, but may clearly be carried out continuously during the entire planarization process. However, the disadvantage of this scheme, relative to those previously described with reference to FIGS. 9 and 10, resides in its inability to measure uniquely only the required thickness of dielectric on the front face of the wafer.

The measurement conducted with the system disclosed in FIGS. 9 or 10 may be exemplified by the following example:

A 2 μm PETEOS film was deposited on one broad (front) face of a 5" (12.85 cm) diameter silicon slice. The back of the slice was bare. The electrode structure 25 of FIG. 7 employed a steel disc 5.84 cm (2.3") in diameter as the measurement electrode 26, surrounded by a 0.63 cm (¼") wide insulator 28, a 0.63 cm (¼") wide steel guard electrode 27, a 0.63 cm (¼") insulator 29, and a ground plane. The entire electrode structure 25 was ground flat to better than 0.0025 cm (1 mil) tolerance and covered with a 0.05 cm (~20 mil) thick sponge pad 13, perforated with 0.18 cm (¼") holes on 0.63 cm (¼") centers.

The measurements were conducted with the circuitry shown in FIG. 10. In this example measurements were made underwater (simulating an aqueous slurry), with a flat, grounded, metal plate pressing the silicon slice onto the electrode structure.

Figure 15:
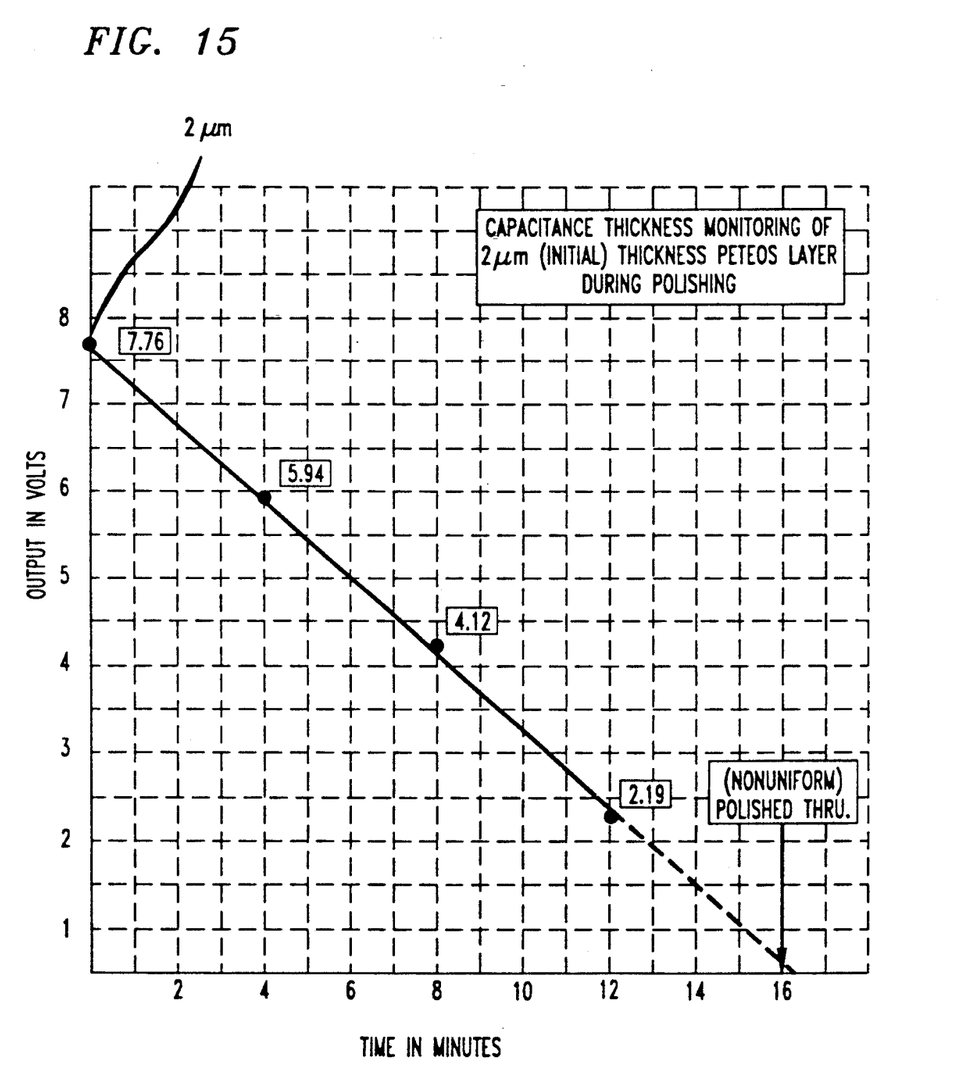
FIG. 15 is a graph of time in minutes versus output in volts, showing linearity of material removal with time, and demonstrating the performance of the measurement method.

The measurements were conducted as follows: The silicon wafer was measured initially, yielding an output voltage corresponding to the initial dielectric thickness of 2 μm. The slice was then transferred to a commercial aqueous slurry polishing machine for 4 minutes. Following this the slice was removed, rinsed in water and remeasured (under water) to determine the new dielectric thickness. This polishing and remeasuring process was repeated four times. The results are shown in FIG. 15.

These results show that the measurement is linear (this was also confirmed by independent dielectric thickness measurements); the polishing is linear with time; the resolution is high; and the measurement is accurate. This basic point was evidenced by the fact that the film was effectively removed after 16 minutes with just one patch, of perhaps a few hundred nm thickness, remaining.

It is evident that the system described here can be used in a variety of ways. When mounted in the lower element of a polisher, it can monitor film thickness in situ. If arranged to be situated right next to the polishing pad in such a machine, measurements can be made intermittently on a short time scale. Each measurement requires only a small fraction of a second. More complex interleaved electrode structures can readily be arranged, to provide more accurate spatial averaging, if desired. Alternatively, multiple segmented electrodes can be used to provide simultaneous measurements at several locations simultaneously.

We claim:

1. A process for in situ monitoring the thickness of a dielectric material on a lateral surface of an electrically conductive substrate having less than about one megohm-cm resistivity, which comprises
   placing the substrate so that a surface of an electrode structure faces the dielectric material, said electrode structure comprises a measuring electrode, an insulator surrounding the measuring electrode, a guard electrode surrounding said insulator and another insulator surrounding the guard electrode,
   interposing between the substrate and the surface of the electrode structure a film of a conductive liquid with resistivity of less than about 100,000 ohm-cm, said film being in contact with the dielectric material and with the surface of the electrode structure, and measuring the capacitance between the substrate and the electrode structure by applying a measuring (drive) voltage with an operating frequency of up to 5000 Hz to the surface of the measuring electrode and simultaneously removing effects of leakage resistance path on a measuring result by bootstrapping the guard electrode with a guard voltage, and by maintaining constant displacement current resulting from said voltage application, the amplitude of the drive voltage being proportional to the thickness of the dielectric layer.

2. The process of claim 1, in which said conductive material comprises a material selected from the group consisting of silicon, germanium, group III-V compound semiconductors, and group II-VI compound semiconductors.

3. The process of claim 1, wherein said dielectric material comprises a material selected from silicon oxide, silicon nitride, oxynitride, a chemical vapor deposited silicon oxide, plasma enhanced chemical vapor deposited oxide and spin-on glass.

4. The process of claim 1, in which said operating frequency is about 500 Hz.

5. The process of claim 1, in which said monitoring is conducted in the process of planarizing dielectric layer on a lateral face of the conductive substrate.

6. A process for in situ monitoring the thickness of a dielectric material on a lateral surface of an electrically conductive substrate having less than about one megohm-cm resistivity, which comprises
placing the substrate so that a surface of an electrode structure faces the dielectric material, said electrode structure comprises a measuring electrode, an insulator surrounding the measuring electrode, a guard electrode surrounding said insulator and another insulator surrounding the guard electrode,
interposing between the substrate and the surface of the electrode structure a film of a conductive liquid with resistivity of less than about 100,000 ohm-cm, said film being in contact with the dielectric material and with the surface of the electrode structure,
measuring the capacitance between the substrate and the electrode structure by applying a measuring (drive) voltage with an operating frequency of up to 5000 Hz to the surface of the measuring electrode and bootstrapping the guard electrode with a guard voltage, and by maintaining constant displacement current resulting from said voltage application, the amplitude of the drive voltage being proportional to the thickness of the dielectric layer, and
in which two equal electrode structures are arranged side by side, and said measuring voltage is applied to one electrode structure at 180° out of phase to the measuring voltage being applied to the other electrode structure.

7. The process of claim 6, in which said conductive material comprises a material selected from the group consisting of silicon, germanium, group III-V compound semiconductors, and group II-VI compound semiconductors.

8. The process of claim 6, wherein said dielectric material comprises a material selected from silicon oxide, silicon nitride, oxynitride, a chemical vapor deposited silicon oxide, plasma enhanced chemical vapor deposited oxide and spin-on glass.

9. The process of claim 6, in which said operating frequency is about 500 Hz.

10. The process of claim 6, in which said monitoring is conducted in the process of planarizing dielectric layer on a lateral face of the conductive substrate.

11. An apparatus for monitoring the thickness of a dielectric layer remaining on a surface of a workpiece during polishing in a lapping machine with a polishing slurry, said workpiece comprising a conductive portion with resistivity of less than about one megohm-cm and dielectric material on a lateral face of the conductive portion, which apparatus comprises
at least one electrode structure having a flat surface for facing the lateral face of the workpiece being polished, said electrode structure comprising a conductive measuring electrode, an insulator surrounding the measuring electrode, a conductive guard electrode surrounding the insulator and being separated by the insulator from the measuring electrode and another insulator surrounding the guard electrode,
means for providing a conductive liquid medium (the polishing slurry) such that the said face of the workpiece and said flat surface of the electrode structure interface through the liquid medium (aqueous slurry), and
means for measuring the capacitance between the conductive portion of the workpiece and the electrode structure, the measuring means comprises means for supplying drive voltage with an operating frequency of up to 5000 Hz to the measuring electrode and in a bootstrap arrangement to the guard electrode while maintaining constant displacement current resulting from the voltage application, the amplitude of the drive voltage being proportional to the thickness of the dielectric layer thereby measuring the capacitance of the dielectric layer undergoing polishing.

12. The apparatus of claim 11, in which said operating frequency is about 500 Hz.

13. The apparatus of claim 11 in which said measuring comprises an electronic system for supplying drive voltage to said measuring electrode and in a bootstrap arrangement to the guard electrode, and for maintaining constant displacement current so that the resulting magnitude of the drive voltage is automatically proportional to the thickness of the dielectric layer.

14. The apparatus of claim 11, in which the lapping machine comprises a polishing table, a polishing pad on said table, and a movable wafer carrier suspended above the polishing table for bringing the workpiece into contact with said polishing pad.

15. The apparatus of claim 14, wherein said electrode structure is imbedded into the polishing table with its flat surface being in the same plane as the polishing table.

16. The apparatus of claim 14, in which the polishing pad is secured to the polishing table by an adhesive plastic coating, and in which said plastic coating is provided with apertures permitting the liquid medium to make an electrically conductive path to the flat surface of the electrode structure.

17. The apparatus of claim 14, in which the polishing pad is secured to the polishing table by a conductive adhesive.

18. The apparatus of claim 14, in which said polishing table is of a material chosen from conductive and non-conductive materials which are non-contaminating with respect to the material of the workpiece.

19. The apparatus of claim 18, in which said conductive material comprises a material selected from the group consisting of stainless steel, aluminum and cermets, or of metals such as aluminum, chromium or titanium deposited in suitable patterns on insulating materials and said nonconducting material comprises a material selected from the group consisting of quartz, ceramic, glass, plastic, and insulator-coated metals.

20. An apparatus for monitoring the thickness of a dielectric layer remaining on a surface of a workpiece during polishing in a lapping machine with a polishing slurry, said workpiece comprising a conductive portion with resistivity of less than about one megohm-cm and dielectric material on a lateral face of the conductive portion, which apparatus comprises at least one electrode structure having a flat surface for facing the lateral face of the workpiece being polished, said electrode structure comprising a conductive measuring electrode, an insulator surrounding the measuring electrode, a conductive guard electrode surrounding the insulator and being separated by the insulator from the measuring electrode and another insulator surrounding the guard electrode, means for providing a conductive liquid medium (the polishing slurry) such that the said face of the workpiece and said flat surface of the electrode structure interface through the liquid medium (aqueous slurry), means for measuring the capacitance between the conductive portion of the workpiece and the electrode structure, the measuring means comprises means for supplying drive voltage to the measuring electrode and in a bootstrap arrangement to the guard electrode while maintaining constant displacement current resulting from the voltage application, the amplitude of the drive voltage being proportional the to the thickness of the dielectric layer thereby measuring the capacitance of the dielectric layer undergoing polishing, and in which two equal electrode structures are arranged side by side, said measuring voltage is applied to one electrode structure at 180° out of phase to the measuring voltage being applied to the other electrode structure.

21. The apparatus of claim 20, in which said operating frequency is about 500 Hz.

22. The apparatus of claim 20, in which said measuring means comprises an electronic system for supplying drive voltage to said measuring electrode and in a bootstrap arrangement to the guard electrode, and for maintaining constant displacement current so that the resulting magnitude of the drive voltage is automatically proportional to the thickness of the dielectric layer.

23. The apparatus of claim 20, in which the lapping machine comprises a polishing table, a polishing pad on said table, and a movable wafer carrier suspended above the polishing table for bringing the workpiece into contact with said polishing pad.

24. The apparatus of claim 23, wherein said electrode structure is imbedded into the polishing table with its flat surface being in the same plane as the polishing table.

25. The apparatus of claim 23, in which the polishing pad is secured to the polishing table by an adhesive plastic coating, and in which said plastic coating is provided with apertures permitting the liquid medium to make an electrically conductive path to the flat surface of the electrode structure.

26. The apparatus of claim 23, in which the polishing pad is secured to the polishing table by a conductive adhesive.

27. The apparatus of claim 23, in which said polishing table is of a material chosen from conductive non-contaminating with respect to the material of the workpiece.

28. The apparatus of claim 27, in which said conductive material comprises a material selected from the group consisting of stainless steel, aluminum and cermets, or of metals such as aluminum, chromium or titanium deposited in suitable patterns on insulating materials and said nonconducting material comprises a material selected from the group consisting of quartz, ceramic, glass, plastic, and insulator-coated metals.

29. A process of fabricating a device, which comprises fabricating a device structure on a substrate so as to yield a non-planar surface, said substrate having resistivity of less than about one megohm-cm, forming a layer of dielectric material over the non-planar surface, reducing the thickness of said dielectric layer progressively, monitoring the remaining thickness so as to determine a desired end-point of the reduction, and continue fabrication of said device, wherein said desired end-point is determined by measuring the capacitance between the substrate and an electrode structure facing the substrate while the face of the substrate and the surface of the electrode structure facing the substrate are interfaced by a continuous conductive film of a liquid with resistivity of less than about 100,000 ohm-cm, said electrode structure comprising a measuring electrode, an insulator surrounding the measuring electrode, a guard electrode surrounding said insulator and another insulator surrounding the guard electrode, wherein said capacitive measuring includes measuring the capacitance and simultaneously removing effects of leakage resistance on the measuring result by applying a measuring voltage with an operating frequency of up to 5000 Hz to the measuring electrode and in a bootstrap manner to the guard electrode, and by maintaining constant displacement current resulting from said voltage application, the amplitude of the drive voltage being proportional to the thickness of the dielectric layer.

30. The process of claim 29, in which said conductive material comprises a material selected from the group consisting of silicon, germanium, group III-V compound semiconductors, and group II-VI compound semiconductors.

31. The process of claim 30, in which said conductive material is silicon.

32. The process of claim 29 wherein said dielectric material comprises a material selected from the group consisting of silicon oxide, silicon nitride, silicon oxynitride, a chemical vapor deposited oxide, plasma enhanced chemical vapor deposited oxide and spin-on glass.

33. The process of claim 32, in which said dielectric material comprises a chemical vapor deposited oxide.

34. The process of claim 29, in which said operating frequency is about 500 Hz.

35. A process of fabricating a device, which comprises
fabricating a device structure on a substrate so as to yield a non-planar surface, said substrate having resistivity of less than about one megohm-cm,
forming a layer of dielectric material over the non-planar surface,
reducing the thickness of said dielectric layer progressively,
monitoring the remaining thickness so as to determine a desired end-point of the reduction, and
continue fabrication of said device,
wherein said desired end-point is determined by measuring the capacitance between the substrate and an electrode structure facing the substrate while the face of the substrate and the surface of the electrode structure facing the substrate are interfaced by a continuous conductive film of a liquid with resistivity of less than about 100,000 ohm-cm, said electrode structure comprising a measuring electrode, an insulator surrounding the measuring electrode, a guard electrode surrounding said insulator and another insulator surrounding the guard electrode,
wherein said capacitive measuring includes measuring the capacitance and simultaneously removing effects of leakage resistance on the measuring result by applying a measuring voltage with an operating frequency of up to 5000 Hz to the measuring electrode and in a bootstrap manner to the guard electrode, and by maintaining constant displacement current resulting from said voltage application, the amplitude of the drive voltage being proportional to the thickness of the dielectric layer, and
in which two equal electrode structures are arranged side by side, and said measuring voltage is applied to one electrode structure a 180° out of phase to the measuring voltage being applied to the other electrode structure.

36. The process of claim 35, in which said conductive material comprises a material selected from the group consisting of silicon, germanium, group III-V compound semiconductors, and group II-VI compound semiconductors.

37. The process of claim 35, in which said conductive material is silicon.

38. The process of claim 35, wherein said dielectric material comprises a material selected from the group consisting of silicon oxide, silicon nitride, silicon oxynitride, a chemical vapor deposited oxide, plasma enhanced chemical vapor deposited oxide and spin-on glass.

39. The process of claim 35, in which said dielectric material comprises a chemical vapor deposited oxide.

40. The process of claim 35, in which said operating frequency is about 500 Hz.

41. An apparatus for measuring the thickness of a dielectric region on a lateral face of article having a conductive portion with resistivity of less than about one megohm-cm and dielectric material on a lateral face of the conductive portion, which comprises
an electrode structure having a flat surface, the dielectric layer on said article facing the said flat surface, said electrode structure comprises a measuring electrode, an insulator surrounding the measuring electrode, a guard electrode surrounding the insulator and another insulator surrounding the guard electrode,
conductive liquid means for interfacing the conductive article and the flat surface of the electrode structure and for establishing an electrical connection between the conductive article and said flat surface of the electrode structure, and
means for measuring the capacitance between the conductive article and the measuring electrode structure, the measuring means comprises means for supplying drive voltage with an operating frequency of up to 5000 Hz to the measuring electrode and in a bootstrap arrangement to the guard electrode thereby measuring the capacitance of the dielectric layer thickness without interfering leakage resistance.

42. The apparatus of claim 41 in which said measuring means comprises an electronic system for supplying drive voltage to said measuring electrode and in a bootstrap arrangement to the guard electrode, and for maintaining constant displacement current so that the magnitude of the drive voltage is thereby proportional to the thickness of the dielectric layer.

43. The apparatus of claim 41, in which said operating frequency is about 500 Hz.

44. An apparatus for measuring the thickness of a dielectric region on a lateral face of article having a conductive portion with resistivity of less than about one megohm-cm and dielectric material on a lateral face of the conductive portion, which comprises
an electrode structure having a flat surface, the dielectric layer on said article facing the said flat surface, said electrode structure comprises a measuring electrode, an insulator surrounding the measuring electrode, a guard electrode surrounding the insulator and another insulator surrounding the guard electrode,
conductive liquid means for interfacing the conductive article and the flat surface of the electrode structure and for establishing an electrical connection between the conductive article and said flat surface of the electrode structure,
means for measuring the capacitance between the conductive article and the measuring electrode structure, the measuring means comprises means for supplying drive voltage to the measuring electrode and in a bootstrap arrangement to the guard electrode thereby measuring the capacitance of the dielectric layer thickness without interfering leakage resistance; and
in which two equal electrode structures are arranged side by side, and said measuring voltage is applied to one electrode structure at 180° out of phase to the measuring voltage being applied to the other electrode structure.

45. The apparatus of claim 44 in which said measuring means comprises an electronic system for supplying drive voltage to said measuring electrode and in a bootstrap arrangement to the guard electrode, and for maintaining constant displacement current so that the magnitude of the drive voltage is thereby proportional to the thickness of the dielectric layer.

46. The apparatus of claim 44, in which said operating frequency is about 500 Hz.

* * * * *